UNITED STATES PATENT OFFICE.

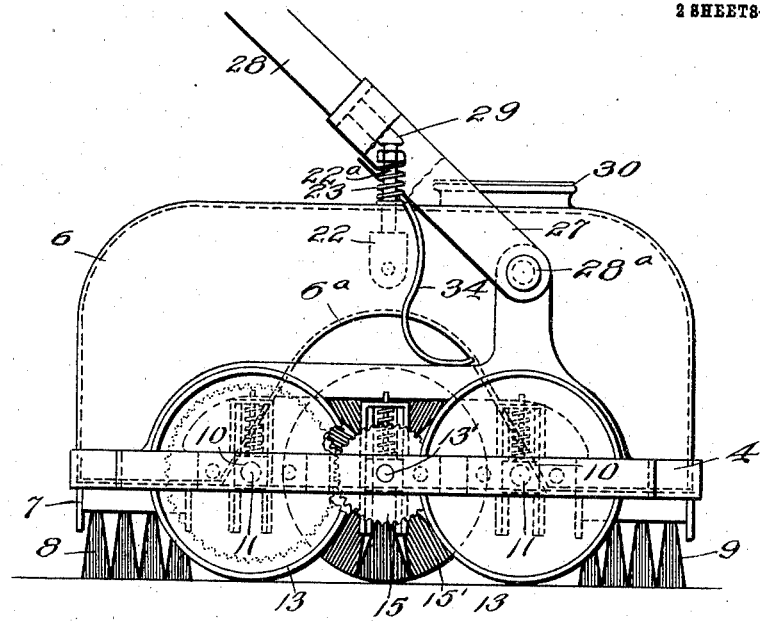

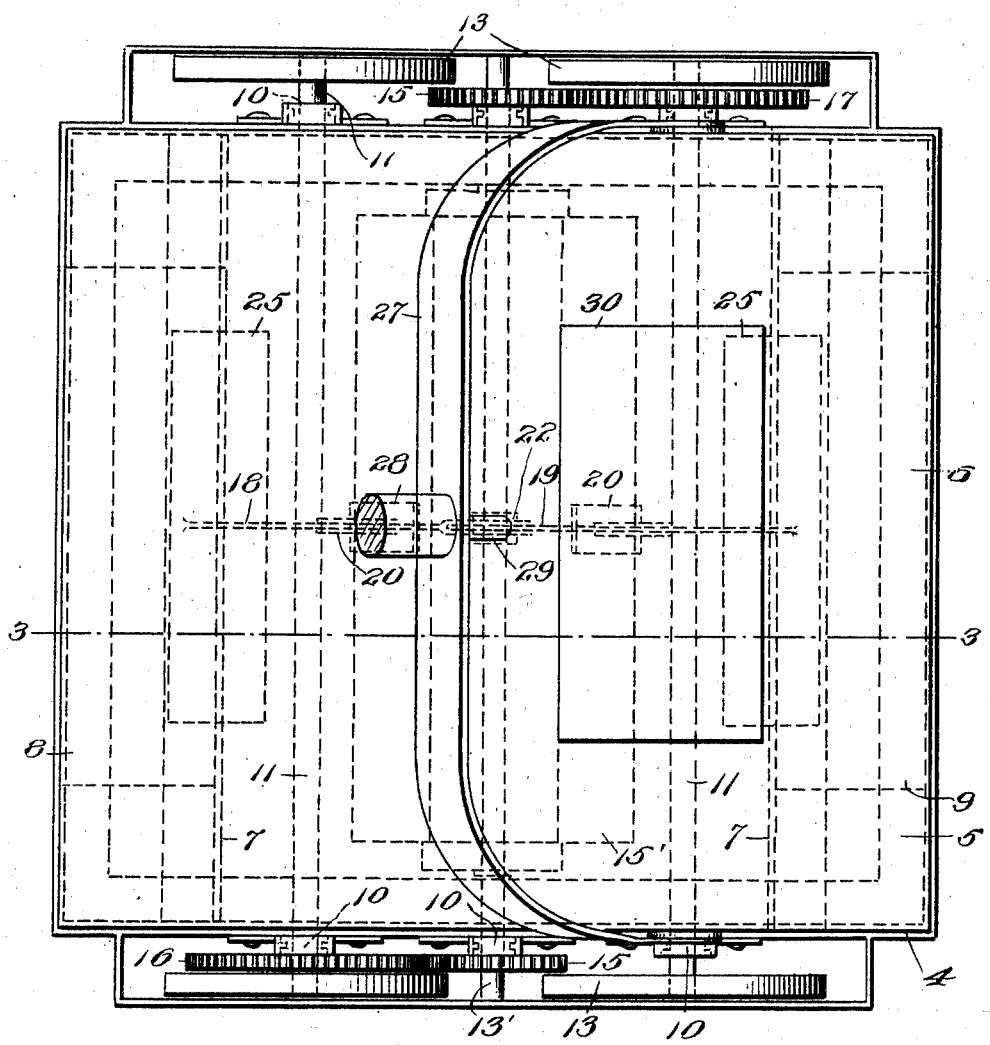

ALDEN C. ANDREWS, OF CHICAGO, ILLINOIS.

SCRUBBING-MACHINE.

967,301.  Specification of Letters Patent.  Patented Aug. 16, 1910.

Application filed September 25, 1909. Serial No. 519,514.

*To all whom it may concern:*

Be it known that I, ALDEN C. ANDREWS, citizen of the United States, residing at Chicago, in the county of Cook and State of Illinois, have invented certain new and useful Improvements in Scrubbing-Machines, of which the following is a specification.

This invention relates to scrubbing machines for scrubbing floors and the like, and especially to that type in which a tank is carried on wheels, with a rotatable brush mounted on the frame of the tank, together with fixed brushes located in front of and behind the rotary brush.

The machine contains improvements especially with respect to the location and arrangement of the tank and the brushes, and also with respect to means for controlling the supply of water from the tank to the brushes.

The invention is illustrated in the accompanying drawings in which—

Figure 1 is a side elevation of the machine. Fig. 2 is a top plan view. Fig. 3 is a vertical section on the line 3—3 of Fig. 2.

Referring specifically to the drawings, 4 indicates the frame of the machine. This is substantially rectangular in shape, and is provided with an inwardly projecting ledge 5 which supports the water tank 6. The frame has depending parts or flanges 7 to which the fixed brushes 8 and 9 are fastened, at opposite ends of the machine. On each side of the frame 4, and mounted in guides therein, are vertically slidable box bearings 10 which receive the front and rear shafts 11 which carry the wheels 13 on which the machine travels, and the intermediate shaft 13′ on which the rotary cylinder brush 14 is mounted. Each end of the shaft 13 is provided with a pinion 15 meshing with the gears 16 and 17 on the respective shafts 11.

The water tank 6 has an arched bottom as indicated at 6ª forming a space for the rotary brush and also forming a guard to prevent water flying about from the surface of the brush. For supplying water from the tank devices are provided arranged for operation by the handle of the machine. These devices comprise two levers 18 and 19 located within the tank and pivoted on brackets 20. These levers are curved to conform to the shape of the bottom of the tank, and they are connected at their upper ends by means of a pin 21 and slot connection to a head 22 having a stem 22ª which works up and down through the top of the tank, and is provided with a coiled spring 23 tending to lift the same. The lower end of each lever has a flat valve piece 25 thereon, provided on the underside with a pad 26 of rubber, felt, or similar material. These valves control the flow of water through the holes 35 in the bottom of the tank, said holes being located at opposite ends of the tank, and on opposite sides of the rotary brush. The valves are normally closed by the spring 23.

A handle 28 is connected to the machine by means of a bail 27, pivoted at 28ª to the sides of the tank. The bail has a lug 29, at the middle thereof, projecting downwardly in line with the axis of the handle, in proper position to press on the top of the stem 22ª when the handle is lowered for that purpose.

30 is a cover for the filling hole in the top of the tank.

The cylinder brush is preferably made with two semicircular blocks 31 and 32, fastened to the shaft 13′, and the ends of the blocks 31 and 32 are fitted with threaded caps shown in dotted lines in Fig. 2. A flat spring 34 may if desired be secured to the bail 27, as shown in Fig. 1, to hold the handle in upright position.

In operation, the machine is pushed across the floor by the handle and pressure downward thereon will push in the stem 22 and thereby open the valves 25, permitting a flow of water through the holes 35 to the floor, on both sides of the rotary brush. The machine may be pulled back and forth, and the wheels 12 and intermediate gears will drive the rotary brush 13, the scrubbing action of which is assisted by the fixed brushes 8 and 9 which also serve to prevent dirty water being splashed or spattered along the floor or against the walls of a room, serving in this respect as shields.

What I claim as new is:

In a scrubbing machine, the combination of a frame, a tank carried thereon, a brush mounted on the frame, said tank having an outlet in the bottom adjacent the brush, a lever pivoted within the tank and having a valve at one end controlling said outlet, a stem connected to the other end of the lever and working through a hole in the top of the tank, and a handle pivoted to the frame and having a projection arranged to strike and depress the stem and open the valve when the handle is manipulated.

In testimony whereof, I affix my signature in presence of two witnesses.

ALDEN C. ANDREWS.

Witnesses:
  WM. J. ROBINSON,
  NELLIE FELTSKOG.